United States Patent [19]
Smith

[11] Patent Number: 5,610,532
[45] Date of Patent: Mar. 11, 1997

[54] ISOLATED DC FAULT CURRENT SENSOR

[75] Inventor: Gerald L. Smith, Torrance, Calif.

[73] Assignee: MAGL Power Inc., Torrance, Calif.

[21] Appl. No.: 509,325

[22] Filed: Jul. 31, 1995

[51] Int. Cl.$^6$ .......................... G01R 31/00; H02H 3/087
[52] U.S. Cl. .......................... 324/771; 324/537; 324/127; 361/91
[58] Field of Search ..................... 324/500, 537, 324/771, 543, 654, 656, 126, 127; 361/86, 87, 91, 93

[56] References Cited

U.S. PATENT DOCUMENTS

| | | | |
|---|---|---|---|
| 4,251,766 | 2/1981 | Souillard | 324/522 |
| 4,553,187 | 11/1985 | Burns et al. | 361/96 |
| 5,404,094 | 4/1995 | Green et al. | 361/91 X |

Primary Examiner—Kenneth A. Wieder
Assistant Examiner—Glenn W. Brown
Attorney, Agent, or Firm—Monty Koslover

[57] ABSTRACT

A device for detecting the occurrence of a dc current fault in the dc feed bus of a solid state power inverter bridge. The device uses a standard, available dc shunt which is connected in the dc feed bus and which produces an ac component in its output as well as dc as a result of the PWM action of the inverter bridge. An isolation transformer and an absolute value detector process the shunt output signal and present the resulting dc signal to a digital comparator after being summed with a voltage trip level. The comparator will output a low signal indicating a fault current if the instantaneous dc component connected from the isolation transformer is higher than the comparator input trip level. The fault detection action of the invention sensor is virtually instantaneous and can be used to shut down the solid state switches in the bridge and protect them from possible damage.

1 Claim, 1 Drawing Sheet

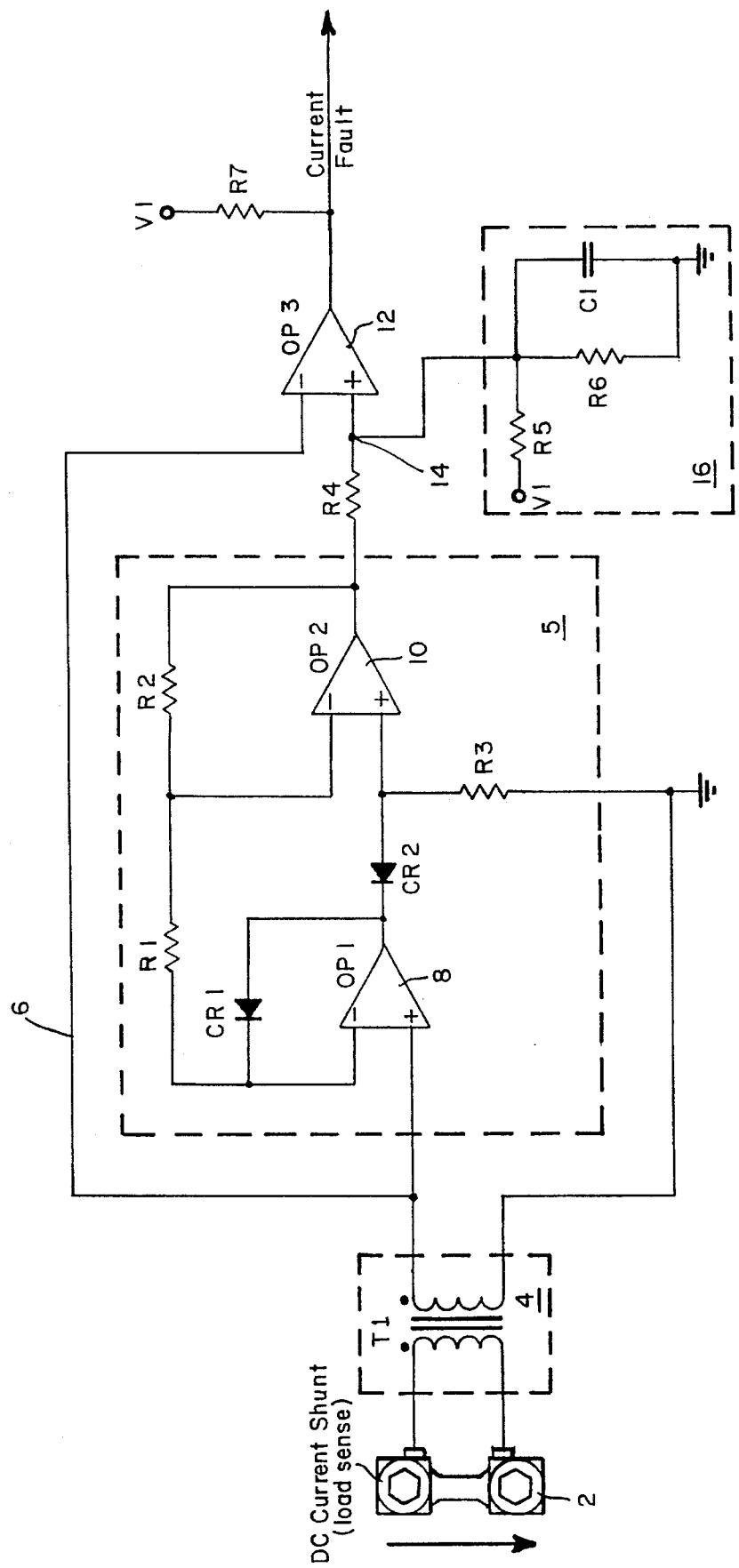

ISOLATED DC FAULT CURRENT SENSOR

BACKGROUND OF THE INVENTION

1. Field of the Invention

This invention relates to devices for monitoring electrical current in electrical equipment, and particularly to a device that will sense dc fault current and output an appropriate signal.

2. Prior Art DC Fault Current Sensors

In solid state power conversion equipment, fuses are usually inserted in the dc feed buses of the inverter bridges. This is to provide protection against short circuit current faults and to prevent destruction of the equipment. However, fault current in the dc feed buses can still destroy the solid state switches before the fuses can blow if it is fast fault current. It has therefore become common practice to incorporate dc fault current sensors in the dc feed buses of inverter bridges. These dc current sensors function to detect a current fault, and output a signal which can be used by the controls to turn off the solid state switches, thus protecting the switches.

Present day dc fault current sensors, which are required to be installed in the dc feed of a solid state inverter bridge, utilize a special magnetic core that is shaped to fit around a given dc bus, and must be sized for the expected operating current, including faults. A Hall device is placed in the magnetic core aperture and is connected to a Hall bias supply and Hall amplifier. A fault current in the dc bus is sensed by the Hall device, which outputs a signal to the amplifier. The amplifier accepts the device signal and outputs an analog signal, indicating a fault current.

The use of a Hall device type dc current sensor carries with it certain disadvantages and creates design problems For the electrical equipment engineer. Since the sensor is a proprietary design, a vendor restriction is placed on the device configuration, dictating the space required for its installation. This often causes considerable difficulty where space is tight.

The Hall device drifts with temperature changes, requiring the use of complex temperature compensation circuitry for the amplifier. The amplifier must also tolerate high common mode coupling between the magnetic core and the Hall device, requiring a complex instrumentation.

The Hall bias supply must furnish high current for proper Hall device function, which operates at low efficiency. This adds a burden to the electrical equipment power supply and additional heat to be dissipated in usually close quarters.

Magnetic effects after load steps may cause false output signals, requiring some form of filtering out these false signals to be added.

Long term drift effects due to the Hall device with time, must becalibrated else the device will become inaccurate.

A final disadvantage is the low reliability of the device, relative to other types of sensors (e.g., voltage, temperature etc.), due to a high component count. Thus, there exists a need for a simple dc current sensor which does not exhibit the problem areas described above; that does not restrict a power inverter designer to particular configurations; that is reliable and is relatively inexpensive.

SUMMARY OF THE INVENTION

The invention comprises four sub-circuits; an input signal circuit, an absolute value detector circuit, a trip level set circuit and an output signal circuit. These operate in the following manner: A dc current shunt is inserted into the dc bus feed of a solid state power inverter bridge. The shunt produces a dc signal overlaid with an ac component and is connected to an isolation transformer. This Forms the input signal circuit and produces an ac signal output at the secondary of the isolation transformer. The ac signal is applied to the input of an absolute value detector which functions to present the average negative dc value of the ac signal to a compensation weight resistor in the output circuit. The trip level circuit tracks the average load current and adjusts the trip level to the load. The compensation weight resistor output is summed with the trip level at a summing point and input to an integrated digital comparator which produces an output going low if a fault current level has been detected.

The unique invention circuit method takes advantage of the fact that the switching action of a solid state power inverter bridge forces current to flow in both directions in the dc bus, causing the dc current in the shunt to have an ac component as well as dc. The result is a sensor which is not subject to temperature or time drift, and which can respond immediately to fast fault currents.

Accordingly, it is a principal object of this invention to provide a dc current sensor that can be easily installed in any configuration solid state inverter bridge and will be circuit universal, using a proper shunt, with any current value.

Another object is to provide a dc current sensor which has a precise output and is not subject to temperature or time drift.

Yet another object is to provide a dc current sensor which incorporates high voltage isolation without incurring a large bulk at the same time.

An important advantage of the invention is its low power dissipation and usage. Another advantage is its relatively low cost.

Further objects and advantages of the invention will be apparent from studying the following portion of the specification, the claims and the attached drawings.

BRIEF DESCRIPTION OF THE DRAWINGS

FIG. 1 is a simplified schematic diagram of the present invention isolated dc fault current sensor, particularly showing the connection of a standard dc current shunt as part of the input signal circuit and outlining the sub-circuits which comprise the device.

DESCRIPTION OF THE PREFERRED EMBODIMENT

Referring particularly to the drawing, there is shown in FIG. 1 a simplified schematic diagram of the invention dc fault current sensor. The sensor device comprises an input signal circuit, an absolute value detector circuit 5, a trip level circuit 16 and an output signal circuit.

From the left of FIG. 1, a standard dc current shunt 2 is inserted into the dc feed of a solid state power inverter bridge. The input signal circuit comprises a dc current shunt 2 and an isolation transformer T1, 4. PWM switching action of the transistor power switches in the inverter bridge forces current to flow in both directions and, in combination with the inverter bridge diodes and the load, produces a pumping action causing the dc current within the shunt to have an ac component. Thus the shunt output will have a dc signal riding on top of an ac signal. The shunt output signal is connected to the primary of T1 isolation transformer 4 and is magnetically coupled to the T1 transformer secondary. The T1 transformer secondary output is applied to the input of an absolute value detector 5, and also 6 to the input of OP3 which is an integrated digital comparator 12 in the output circuit.

The absolute value detector circuit 5 is a well known circuit configuration employing operational amplifiers and is described by Paul Horowitz and Winfield Hill in "The Art Of Electronics", published by Cambridge University Press, 1980. For this application, the op-amps are connected in negative polarity to produce an average negative dc ripple voltage value of the input ac signal. The absolute value detector circuit comprises two operational amplifiers OP1 and OP2, two diodes CR1 and CR2, two feedback resistors R1 and R2, and a bias resistor R3. The input ac signal is applied to the positive input terminal of OP1, 8, and the negative dc ripple output signal is produced by OP2, 10. This negative dc ripple signal is presented to a compensation weight resistor R4 which together with an integrated digital comparator OP3, 12 and an output pullup resistor R7 comprise the output signal circuit. The compensation weight resistor R4 output signal which is a negative ripple dc, is connected to a summing point 14 for summing with a trip level circuit 16 output.

The trip level circuit consists of a voltage divider and a filter capacitor, comprising two resistors R5 and R6 connected in series and a filter capacitor C1 connected in parallel with resistor R6. Resistor R5 is supplied by a logic reference voltage V1 and resistor R6 and the capacitor C1 are connected to ground. The divider center point is connected to the summing point 14, thus providing a fixed positive dc voltage for summing with the negative dc ripple voltage output of the compensation weight resistor R4 as well as filtering the ripple with the capacitor C1. The summed voltage signal is connected to the positive input terminal of OP3, the integrated digital comparator 12.

It should be understood that the output of the absolute value detector circuit 5 represents the dc bus average load current as a dc voltage analog signal. When this output signal, modified by the weight compensation resistor is summed with the trip level circuit voltage, the net result of this action is to track the average load current and to adjust the trip level voltage proportional to load.

If the load is light—the dc normal current is low—then the trip level at the summing junction 14 will be high for a high current trip. If the load is heavy, the trip level at the summing junction 14 will be lower, which will result in a lower current trip level.

As noted earlier, the output signal from the transformer 4 is also connected and applied to an input terminal of the OP3 integrated digital comparator 12 for comparison with the trip level. Fault current can be fast, but the coupling action of transformer T1 directly into the OP3 integrated digital comparator 12 ensures immediate response to any level above the trip point at the summing junction 14 of resistors R4, R5 and R6. As stated earlier, although transformer T1 passes only ac voltage waves, an instantaneous dc component will be coupled through on top of the ac wave.

When the integrated digital comparator OP3, 12 sees an input signal above the trip point, it responds with an output signal which goes low, pulled up by pullup resistor R7, indicating a dc current fault.

The individual components of the dc current sensor are now discussed. The dc current shunt is a standard low cost shunt, sized and selected for its expected maximum current. Its output is very precise and does not require compensation or correction for drift.

The isolation transformer T1 is constructed with a small number of turns on a small physical size core and has high voltage isolation, typically 4,000 volts. Common mode rejection is high due to the small number of turns and small size core. There are no likely saturation problems with the transformer because of its low voltage operation with the shunt and the natural reset action of the core.

The remainder of the device is a simple logic circuit composed of very low power, low voltage components which could be integrated in a small area.

The combination of the foregoing dc current sensor components produces a device having a low parts count, which given conservative parts selection criteria, results in a high device reliability. Further, due to the low number of parts, their simplicity and non-critical characteristics, the expected device cost will be low.

From the foregoing description of the preferred embodiment it is clear that the objects of the invention are achieved. Alternative embodiments and various modifications may be apparent to those skilled in the art. These alternatives and modifications are considered to be within the spirit and scope of the present invention.

Having described the invention, what is claimed is:

1. An isolated dc fault current sensor device comprising:

(a) an input signal circuit, comprising a dc current shunt and an isolation transformer, said shunt being connected into the dc feed bus of a solid state power inverter bridge and the output signal of said shunt having both an ac and dc component, the output of said shunt being connected to the primary coil of said isolation transformer; said isolation transformer producing an ac signal with an instantaneous dc component at its secondary coil terminals;

(b) an absolute value detector circuit receiving said ac signal connected to its input positive and ground terminals; said absolute value detector circuit being configured for negative polarity and producing a negative dc ripple voltage signal at its output terminal;

(c) an output signal circuit, comprising a first resistor connected to the negative dc ripple voltage signal output of said absolute value detector circuit, said first resistor functioning as a compensation weight resistor, an integrated digital comparator having its positive input terminal connected to the output of said compensation weight resistor and having its negative input terminal connected to the secondary coil of said isolation transformer, and a second resistor connected to the output of said comparator and to a logic reference voltage, and functioning as a pullup resistor; and (d) a voltage divider circuit comprising a third resistor supplied by a logic reference voltage, a fourth resistor connected to the third resistor and logic ground, and a capacitor connected in parallel with said fourth resistor; the center point output voltage of said voltage divider circuit being connected to the output of said compensation weight resistor for summing with its negative dc ripple voltage signal and filtering it, providing a trip level voltage signal input to said integrated digital comparator;

said isolation transformer, in the event of a dc fault current occurrence in said dc feed bus, producing a high dc voltage signal coupled on top of the ac signal, which is connected to an input terminal of said integrated digital comparator, said integrated digital comparator, comparing the high dc voltage signal with the trip level voltage at its other input terminal and producing a low signal at its output, indicating a dc current fault.

* * * * *